United States Patent
Akgulian et al.

[15] 3,672,696
[45] June 27, 1972

[54] LAWN MOWER ADJUSTABLE SKID ASSEMBLY

[72] Inventors: Sahag C. Akgulian; Donald G. Haffner, both of Racine, Wis.

[73] Assignee: Jacobsen Manufacturing Company, Racine, Wis.

[22] Filed: May 15, 1970

[21] Appl. No.: 37,664

[52] U.S. Cl. ............................................. 280/15, 280/43.17
[51] Int. Cl. ............................................................ B62b 13/06
[58] Field of Search ............ 280/43, 43.17, 43.37 R, 43.37 C, 280/9, 11, 12, 12 M, 24, 15; 56/17.2, 249, 252, 253

[56] References Cited

UNITED STATES PATENTS

| | | | |
|---|---|---|---|
| 1,966,972 | 7/1934 | Seeley | 56/17.2 |
| 2,532,733 | 12/1950 | Sawtelle | 56/253 |
| 2,329,383 | 9/1943 | Bly | 56/252 |

FOREIGN PATENTS OR APPLICATIONS

| | | | |
|---|---|---|---|
| 1,028,824 | 5/1966 | Great Britain | 56/249 |

*Primary Examiner*—Benjamin Hersh
*Assistant Examiner*—Robert R. Song
*Attorney*—Arthur J. Hansmann

[57] ABSTRACT

A lawn mower adjustable skid assembly including two spaced-apart skids which engage the ground for elevational support of the mower above the ground. The skids are pivoted to the mower, and adjustable standards connect between the mower and the skids for setting the pivot position of the skids and thereby setting the elevation of the mower. The standards include two bars bolted together for adjusting the overall length of the bars, and adjustment holes and a pin are related to the bars for the length adjustment. A connector extends between the two spaced-apart skids, and the connector is attached between the skids to serve as an anti-scalping bar which extends across the mower at a level above that of the skids so the mower is stable on the skids.

7 Claims, 3 Drawing Figures

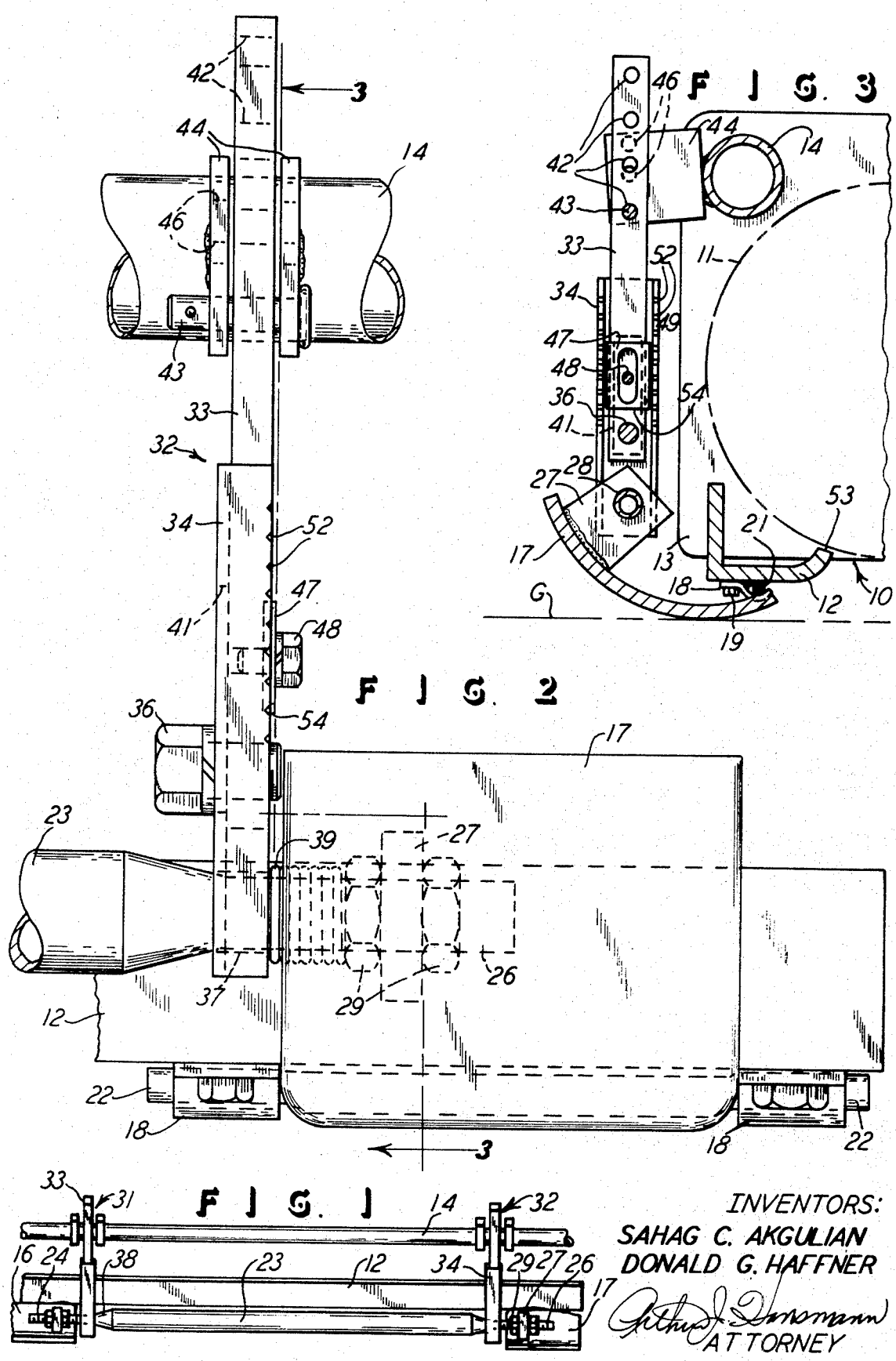

LAWN MOWER ADJUSTABLE SKID ASSEMBLY

This invention relates to a lawn mower adjustable skid assembly. More particularly, this invention relates to a reel type of lawn mower which is supported on the ground by spaced-apart skid shoes, and there is a connection between the mower and the skid shoes, which are pivotal on the mower, for adjusting the skid shoes and thereby adjusting the elevation of the mower relative to the ground. Also, there is an anti-scalping bar extending between the skid shoes.

BACKGROUND OF THE INVENTION

Skid shoes exist in many forms on reel type lawn mowers which do not employ ground-engaging wheels for supporting the mower on the ground. These prior art skid shoes are commonly pivotally mounted to the mower, and they are located either at the rear of the mower or on the opposite sides of the mower. The pivotally mounted skid shoe is available for setting the elevation of the mower relative to the ground so that the cutting height of the mower can be selected and set.

Mowers employing skid shoes are commonly used in industrial type mowing, such as large areas of parks, cemeteries and golf courses, and many other areas of a large size. These large areas commonly have rises and depressions in the ground, and one side of the mower may be supported on the ground while the other side is not, and the center of the mower could be meeting a rise in the ground. In that instance, it is a problem to adequately support the mower across its entire width, even though only one side of the mower is in contact with the ground. To stabilize the skid members, prior art mowers have been arranged with heavy structures which extend between the opposite sides of the mower, and they have also been arranged with skids which extend across the entire width of the mower. However, another problem is created when a skid extends across the entire width of the mower, and that problem is that the skid itself will cause either or both ends of the mower to rise above the ground if the central portion of the skid encounters a rise in the ground. Still further, the prior art mowers with rearwardly located skids are commonly weak and ineffective in stabilizing the mower when it is moving over uneven ground.

Still another problem with prior art skids, which are pivotal and rearwardly located relative to the mower, is the problem of having the skid interfere with the disposal of the grass clippings, whether it be that the clippings are collected in a catcher or that they be thrown from the cutter and onto the ground. Also, the prior art skid assemblies do not adequately provide for easy and accurate setting of the movable skid for achieving the desired elevation of the mower and an accurate cutting height. In this regard, it should be understood that skid-supported mowers are commonly used in gangs which are supported on a tractor, and it is desirable that each mower be set at the same elevation, and, therefore, the elevation should be known, and the elevation should be readily and easily achieveable and accurately maintained. Further, there is a problem in changing all the mowers to the same new elevation when it is desired that the cutting height be changed.

It is a general object and purpose of this invention to provide a skid assembly which is adjustable and which overcomes the aforementioned problems, and which improves upon the skid assemblies heretofore known. In accomplishing this object of improving the assembly heretofore known, the present invention provides an adjustable skid assembly which has accurate and easy adjustment of the skids, and which maintains the skids in a sturdy and definite position, and which provides an anti-scalping member extending across the width of the mower so that the mower will not cut the grass too close, even when the opposite ends of the mower are elevated off the ground.

More specific objects and advantages of this invention include the provision of an adjustable skid assembly which utilizes two spaced-apart pivotal skid shoes which can be set in selected pivoted positions for accurately elevating the mower end-to-end, and with the positions being detectable by indicating means on the members used for setting the elevation. In this respect, where a gang of mowers is employed, each mower can be set to the same indicating means or level, and thereby all mowers will be cutting at the same desired height. Subsequently, if desired, all mowers can be set at a different elevation, but without requiring that the elevation of each mower be measured.

Still further, this invention provides an anti-scalping member in an adjustable skid assembly, wherein the anti-scalping member does not interfere with disposal of the grass clippings, whether the grass clippings be collected in a catcher or be permitted to fall onto the ground. Still further, the anti-scalping member itself is also employed for transmitting the support force from one skid shoe to the other skid shoe, if and when the other skid shoe is spaced above the ground and the adjacent mower end would therefore otherwise be unsupported.

Still further, the present invention provides a lawn mower adjustable skid assembly which employs two spaced-apart pivotal skid shoes which are separately adjustable in elevation, and which has connecting means between the skid shoes, but the connecting means do not require a welded or otherwise permanently connected relationship between parts, though the parts are nevertheless connected in the nature of welded or other permanent connections while they are still capable of being dis-assembled for repair, replacement, shipping, or like reasons.

Other objects and advantages will become apparent upon reading the following description.

BRIEF DESCRIPTION OF THE DRAWINGS

FIG. 1 is a rear and slightly top perspective view showing a preferred embodiment of this invention.

FIG. 2 is an enlarged rear elevational view of a right-hand fragment of the showing in FIG. 1.

FIG. 3 is a sectional view taken on the line 3—3 of FIG. 2, and with the view being on a reduced scale from that of FIG. 2.

DETAILED DESCRIPTION OF THE PREFERRED EMBODIMENT

The drawings generally show and indicate a reel type of lawn mower, generally designated 10, and having a cutting reel, as designated by the dot-dash line 11 in FIG. 3, and a bed knife 12, and two spaced-apart side plates, such as the shown plate 13. The mower 10 also has a tube 14 extending across the width of the mower and serving as part of the mower frame. Thus the mower 10 is of a well-known construction of a reel type mower, and it will therefore be understood that the mower includes two spaced-apart side plates 13, and, extending between the side plates, are the usual mower reel 11, bed knife 12, and frame tube 14, all secured together.

To support the mower on the ground designated G in FIG. 3, and to do so without the use of ground wheels, two spaced-apart skid shoes 16 and 17 are employed. Each of the shoes is pivotally mounted to the mower, and the drawings show the pivot connector to consist of a clamp 18 secured to the bed knife 12 by means of the screw 19, and a rod 21 is affixed to the shoe 17, by welding or the like, so that the rod end 22 is retained by the clamp 18, and thus a pivot connection is provided in the structure described. That is, each shoe 16 and 17 is pivotally mounted on the bed knife 12, and therefore the elevation of the mower 10 may be selected and adjusted according to the pivot position of the shoes 16 and 17 which slide over the ground. FIG. 2 shows that there may be two clamps 18, with one on each side of each shoe 16 and 17, and thus the pivot rod 21 has its two opposite ends 22 pivotally retained by its respective clamp 18.

An inter-connector, in the form of a bar 23, is connected between the shoes 16 and 17, and it is shown to be a solid bar connected to the shoes at the respective bar ends 24 and 26.

The bar 23 is thus available for the dual purpose of transmitting forces between the shoes 16 and 17 and for engaging rises in the ground being transversed so that the mower 10 does not cut too close or scalp the ground where a rise is encountered. That is, the bar 23 is an anti-scalping bar, and it is also a member which reinforces the strength of the mower, especially when one of the shoes is not riding on the ground.

Each shoe 16 and 17 has a plate 27, shown welded thereto, and the plate has an opening 28 for receiving the respective end 24 or 26 of the bar or inter-connector 23. The bar ends 24 and 26 are shown threaded in FIG. 1, and nuts 29 are threaded onto the bar ends 24 and 26 for securely fastening the bar 23 to the plates 27.

Standards, generally designated 31 and 32, are connected between the mower frame tube 14 and the bar 23. The standards 31 and 32 are adjustable in their overall length between their points of connection, and thus the adjustment is in the vertical direction so that the skid shoes 16 and 17 can be separately set in the desired pivotal position for controlling desired elevation of the mower 10, including the end-to-end elevational setting of the mower.

Each standard 31 and 32 includes a bar 33 and a bar 34, and the latter is shown to be U-shaped in cross-section for slidably receiving the upper bar 33. The two bars 33 and 34 are secured together by a screw 36, and, the lower end of each bar 34 has an opening 37 through which the respective ends 24 and 26 of the bar 23 are passed. At this time it will also be noticed that the bar ends 24 and 26 have tapered portions 38, and the smaller cross-sectional size of the tapered portion 38 is less than the size of the bar opening 37, so the end 38 extends slightly into the bar opening 37 for snug contact between the bars 23 and 34, as seen in FIG. 2. Also, a compression spring 39 extends between the nut 29 and the bar 34 to urge the bar 34 snugly onto the tapered or conical portion 38 of the bar 33, for the firm and snug fit described.

FIGS. 2 and 3 show that the bars 33 and 34 are connected by the screw 36, and the bar 34 has a slot 41 through which the screw 36 extends. This slotted arrangement permits overall length adjustment of the bars 33 and 34 when the screw 36 is loosened. Further, the upper end of the bar 33 is provided with a series of four openings 42, each of which is available for receiving a pin 43 extending between ears 44 welded to the mower tube 14. The pin 43 can of course be withdrawn from the shown position on the ears 44 and the bar 33, and the standard can then be placed in another position of adjustment by aligning the selected one of the bar holes 42 with one of three holes 46 in the ears 44. In this manner, the standards 31 and 32 are further adjustable in their overall effective length and between their connection points on the mower 10 and the inter-connector 23. In all, a vertical adjustment of several inches is possible for the average size of mower 10 and for the standards 31 and 32, when constructed as shown. Further all increments of adjustment are possible within the limits of several inches, and such is made possible by virtue of the screw 36 and its adjusting slot 41, as described.

Recognizing that skid-type mowers are commonly used in gangs, it is significant that each of the several mowers be adjusted to the same elevation. Also, the mowers should be capable of being all re-set to a different but common elevation. To achieve this, indicator means are provided in the form of a U-shaped piece 47 which is secured to the bar 33 by a screw 48 passing through a slot 49 in the piece 47. The piece 47 can be slid up and down on the bar 33, within the longitudinal limits of the slot 49.

The user can then place the mower or all of the mowers on a surface such as a driveway or garage floor, and he can measure the elevation of the bed knife cutting edge 53 above the floor or ground line G, and at both ends of the bed knife 12. All of the mowers can be set at the same elevation, by use of adjusting the standards through loosening the screw 36. Then the index member 47 can be set to have its alignment indicator means, such as the lower edge 54 align with one of the notches 52 on the bar 34, and this same setting of the member 47 can be made on all standards 31 and 32 and on all the mowers. With all the mowers set at the same elevation for the bed knife 12, and with all of the indicator means 47 set by means of the adjusting slot 49 and the retaining screw 48, then, when the operator wants to change the cutting height, all he needs to do is loosen the screw 36 and move the bars 33 and 34 to where the indicator edge 54 will differently relate to one of the notches 52. All standards 31 and 32 can be similarly re-set. This avoids remeasuring the elevation of the respective ends of all mowers each time the cutting height needs to be changed. This arrangement takes into consideration the fact that the mowers may vary from end to end, due to either manufacturing tolerances or to wear of the cutting parts, the shoes, and the like. Still further, each shoe 16 and 17 is individually set by its respective standard 31 or 32, so the ends of the mowers are set accurately so that the entire mower can be accurately set for cutting. Still further, with the shoes 16 and 17 spaced apart, as seen in FIG. 1, the mower is stable from end to end, and also, with the inter-connector 23 being at an elevation higher than the lowest or ground engaging surface on the shoes 16 and 17, when the mower meets a rise in the ground where the inter-connector 23 engages the rise, the inter-connector 23 serves its anti-scalping purpose to raise the entire mower, as desired. That is, the spaced-apart shoes provide the end-to-end mower stability desired, and, at the same time, the anti-scalping function is also achieved.

What is claimed is:

1. In a lawn mower, an adjustable skid assembly of the type including a pair of spaced-apart skid shoes for sliding on the ground, a pivot connector on said skid shoes for pivotally connecting said skid shoes to the mower for establishing the elevation of the mower above the ground, an inter-connector connected to and extending between said skid shoes and above the lowest level thereof for transmitting the ground force to the mower and to and from said skid shoes, adjustment means connected between said interconnector and the mower for up-and-down adjustment of said inter-connector and said skid shoes, said adjustment means including a pair of spaced-apart standards with each of said standards being operatively connected to a respective one of said skid shoes at respective locations immediately adjacent the respective one of said skid shoes for independent adjustment of each of said skid shoes, each of said standards having length-adjusting means for separately and independently adjusting the length of each of said standards and thereby selectively pivotally positioning each of said skid shoes on the mower, the improvement comprising each of said standards having an opening on the lower end thereof for snugly receiving the respective end of said inter-connector, a plate fixed on each of said skid shoes in a spaced relation with respect to said pivot connector and having a hole for receiving said respective end of said inter-connector, and fastening means on each end of said inter-connector for holding each said plate on said inter-connector.

2. The adjustable skid assembly as claimed in claim 1, wherein said fastening means is a nut threaded onto said inter-connector for clamping said inter-connector to said plate and thereby permit the transmitting of forces between said shoes and the mower through said standards.

3. The adjustable skid assembly, as claimed in claim 1, wherein said inter-connector is a rod having tapered ends at said standard openings for a self-seating snug fit into said standard openings.

4. The adjustable skid assembly as claimed in claim 1, including means operatively associated with said inter-connector and said standard for securing the latter two together.

5. The adjustable skid assembly as claimed in claim 4, wherein the last said means is a spring.

6. The adjustable skid assembly as claimed in claim 3, including a spring operatively associated with said standard for urging the latter onto said tapered end of said rod and toward the larger end of said tapered end to effect the snug fit.

7. The adjustable skid assembly as claimed in claim 6, wherein said spring is a compression spring and there is disposed between each said plate and each said standard one said spring.

* * * * *